United States Patent [19]

Penney

[11] Patent Number: 4,636,611
[45] Date of Patent: Jan. 13, 1987

[54] QUIESCENT CIRCLE AND ARC GENERATOR

[75] Inventor: Carl M. Penney, Schenectady, N.Y.

[73] Assignee: General Electric Company, Schenectady, N.Y.

[21] Appl. No.: 723,591

[22] Filed: Apr. 15, 1985

[51] Int. Cl.⁴ .............................................. B23K 9/12
[52] U.S. Cl. .............................. 219/124.34; 318/577; 350/170; 350/286; 353/81
[58] Field of Search ..................... 219/124.34, 121 LP, 219/121 LR, 121 LS; 350/170, 286; 353/34, 81, 82, 38; 318/577

[56] References Cited

U.S. PATENT DOCUMENTS

| | | | |
|---|---|---|---|
| 3,419,321 | 12/1968 | Barber et al. | 219/121 LR |
| 3,534,462 | 10/1970 | Cruickshank et al. | 219/121 LR |
| 3,547,526 | 12/1970 | Devereux | 350/286 |
| 3,670,260 | 6/1972 | Koester et al. | 350/286 |
| 3,848,970 | 11/1974 | Goodell | 219/121 LR |
| 4,135,902 | 1/1979 | Oehrle | 65/2 |
| 4,275,288 | 6/1981 | Makosch et al. | 219/121 LR |
| 4,289,378 | 9/1981 | Remy et al. | 219/121 LS |
| 4,409,478 | 11/1983 | Libby | 250/236 |
| 4,491,719 | 1/1985 | Corby, Jr. | 219/124.34 |
| 4,501,950 | 2/1985 | Richardson | 219/124.34 |
| 4,504,123 | 3/1985 | Smith | 350/170 |

FOREIGN PATENT DOCUMENTS

WO79/00004  1/1979  PCT Int'l Appl. .

*Primary Examiner*—Clifford C. Shaw
*Attorney, Agent, or Firm*—Donald R. Campbell; James C. Davis, Jr.; Paul R. Webb, III

[57] ABSTRACT

The optical properties of circular prisms, which are also known as axicons, are utilized in optical systems that generate one or more quiescent, steady in time, sharply focused circular and arc-shaped patterns of light. A laser beam incident on the circular prism is deviated by the prism effect and the emerging beam focused onto a target surface by a spherical lens or zoom lens; the radius of the circle is conveniently adjusted. Systems with stationary optics are described to efficiently form two concentric, uniform circles, or two offset circular or approximately circular arcs, from input beams derived from one or two lasers. These structured light patterns are used in tracking an edge or groove, for instance to locate the workpiece joint in robotic arc welding.

3 Claims, 10 Drawing Figures

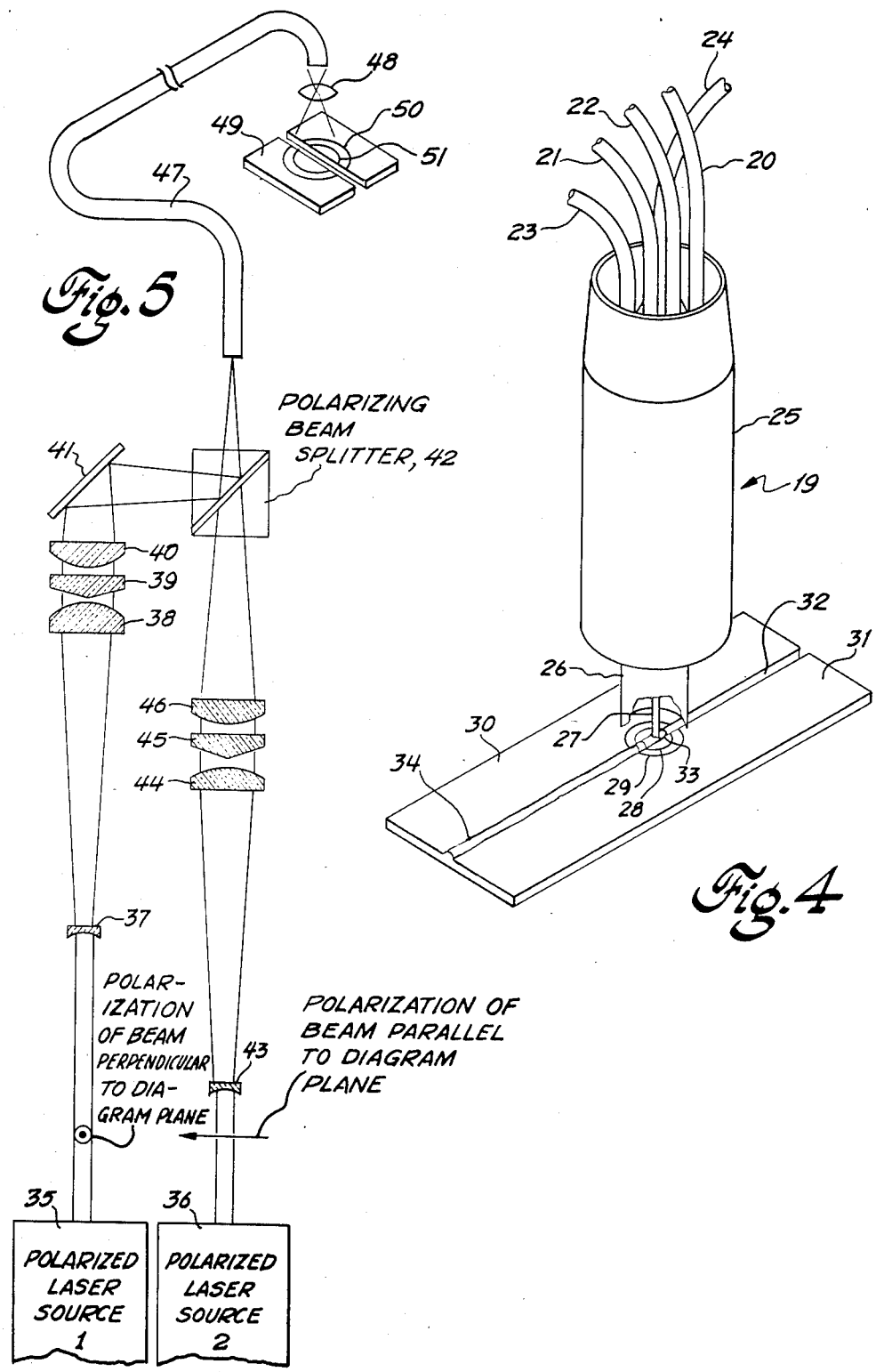

QUIESCENT CIRCLE AND ARC GENERATOR

BACKGROUND OF THE INVENTION

This invention relates to optical systems to produce quiescent light patterns, and to generating circles, cirrcular arcs, and approximately circular arcs that are formed by stationary optics and are steady in time for edge and groove tracking applications.

There is a need to generate small circles of light to form guiding stripes for joint location in such operations as automated welding with active torch/joint tracking. Presently, stripes are employed to locate joints which do not curve rapidly. Circles generated by a rotating prism have been used to track around corners or curves with radii smaller than about one inch. However, these circles, because they are formed from a rapidly rotating point, generate interference patterns when viewed by a television camera. Tests have shown that varying the prism rotation rate over wide ranges does not remove these patterns, merely changing their shape and motion. Therefore, a means is needed for generating quiescent circles whose radii can be conveniently adjusted. One reference on this prior art technique to trace parallel laser stripes and concentric circles on the face of a coherent fiber optic bundle by which they are transferred to a vision-guided arc welding torch and hence reimaged on the workpiece surface just ahead of the weld puddle, is commonly assigned U.S. Pat. No. 4,491,719.

Another method for generating circles, steady in time, involves focusing a beam down onto a small concentric cylindrical reflector. The Center for Welding Research at Ohio State University has described this approach in one of their member reports. The main problem with this configuration for applications within a weld torch is that the cylindrical reflector must be kept clean. Alternatively, if a coherent fiber optic bundle transfers a circular pattern to the torch, the circle projected on the bundle face must be very small (typically less than 3 mm in diameter). However, it is difficult, and thus expensive, to make small circles efficiently using a cylindrical rod reflector, because the cylinder itself must be substantially smaller than the circle, rather long and of good optical quality, and held straight in just the right place.

One or more circular prisms, also known as axicons, are employed in the present invention to generate circles and arcs. Previously, circular prisms have been employed in various applications where light dispersed about a constant polar angle must be focused to a point. One example of this is in the analysis of light passed through a Fabry-Perot interferometer.

SUMMARY OF THE INVENTION

A basic optical configuration and several variations are presented which generate sharply focused circles and arcs that are quiescent; they are steady in time because they are not formed from a rapidly scanned point, but rather by stationary optics. This invention utilizes the optical properties of circular prisms, sometimes called axicons, such as the one illustrated in FIG. 1. Embodiments are disclosed to form one or more concentric, uniform circles efficiently from light beams generated by one or more light sources and other embodiments to form a plurality of circular and approximately circular arcs. The radii of the quiescent circles and arcs can be adjusted conveniently.

An optical system to generate a single quiescent circle is comprised of a collimated light beam source, a circular prism to deviate the incident beam through a constant polar angle by the prism effect, and a spherical lens to focus the deviated beam to a uniformly illuminated circle whose radius depends on the focal length of the lens. A variable focus zoom lens is substituted for the spherical lens to get a circle whose radius is readily adjusted. Two or more concentric circles are generated by a compound circular prism comprised of concentric circular prism segments having different wedge angles, for instance two segments if two concentric circles are desired, followed by a focusing lens. The circles have approximately the same brightness when the radii of the concentric prism segments are properly chosen.

Another optical system for generating two concentric circles from two laser sources, or two light beams derived from one laser, has stationary optical systems to separately generate quiescent circles of different radii, each system comprised of a circular prism and a focusing lens. Means are provided, such as a beam splitter, to combine the circles and project them onto a target surface. Preferably the light beams incident on the circular prisms are orthogonally polarized and the combiner is a polarizing beam splitter.

Quiescent circular and approximately circular arc-shaped patterns are generated by the following system. A cylindrical beam expander is provided to expand a narrow light beam in one direction. The elongated rectangle of light is incident on one segment of a circular prism, and beams deviated by the prism effect are focused by a spherical lens or a zoom lens. Two spatially displaced arcs are formed by essentially the same optical system; two light beams from two lasers are presented to the cylindrical beam expander.

Another feature of the invention is the provision of means to project the quiescent circles and arcs onto a workpiece having an edge or groove to be tracked. The target surface on which the patterned light is focused may be the entrance of a coherent fiber optic bundle by which they are transferred to a vision-guided welding torch for use in tracking a groove in a workpiece.

BRIEF DESCRIPTION OF THE DRAWINGS

FIG. 4 is a simplified perspective view of a vision-guided arc welding torch and the structured light pattern projected onto the workpiece to track the joint and assess weld quality.

FIG. 5 is an optical system for generating two quiescent concentric circles with a chosen diameter ratio from two laser sources; the light pattern formed on the face of a coherent fiber optic bundle is reimaged on a weld surface.

DETAILED DESCRIPTION OF THE INVENTION

Figure 1A:
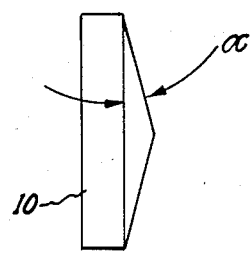
FIGS. 1a and 1b are side and front views of a circular prism (axicon)
Figure 1B:
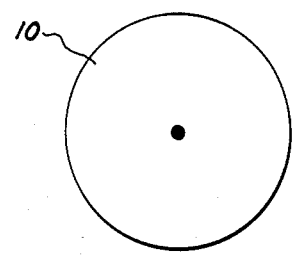
Figure 1C:
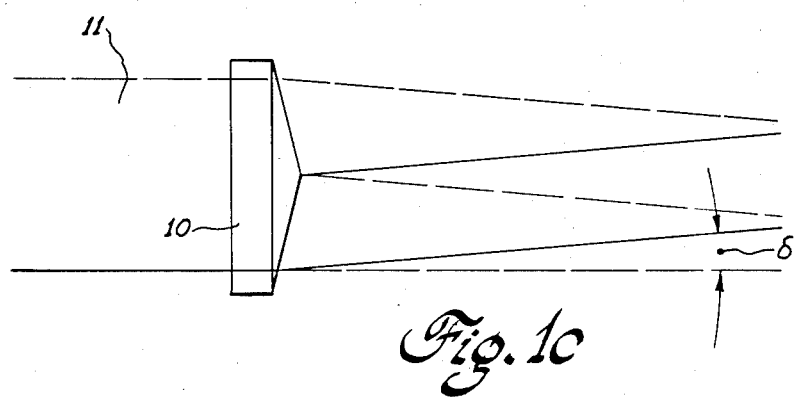
FIG. 1c shows the effect of this prism on a collimated incident-beam.

The circular prism or axicon is shown in FIGS. 1a and 1b and has a wedge angle α. FIG. 1c illustrates the effect of this type of prism upon an incident collimated light beam 11. Different parts of the beam are shown in solid and dashed lines, respectively, to clarify the drawing. Each part of the beam is bent through a polar angle δ. Snell's Law of refraction can be used to calculate the angle of deviation:

$$\delta = \arcsin(n \sin\alpha) - \alpha \quad (1)$$

Here n is the refractive index of the prism material (usually glass or plastic) relative to the refractive index of the surrounding medium (usually air), and α is the prism or wedge angle. The axicon by itself generates a defocused, fuzzy annulus of light, but a sharp circle is wanted.

Figure 2A:
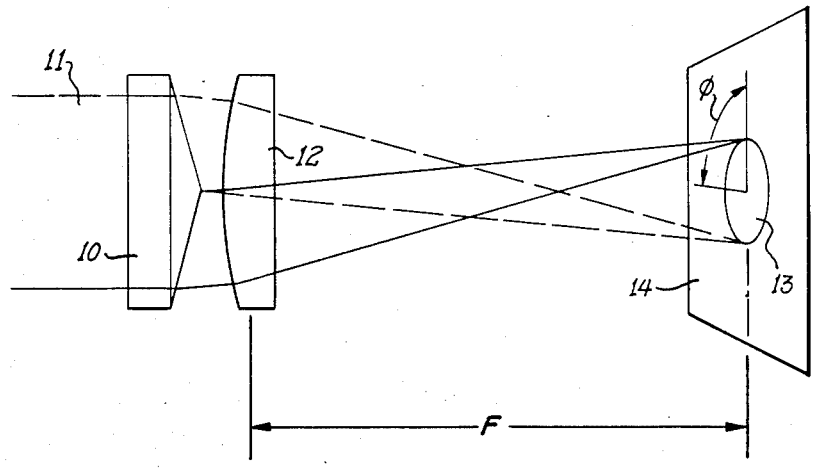
FIGS. 2a and 2b illustrate formation of a focused, quiescent projected circle using a circular prism and a spherical lens or zoom lens.

FIG. 2a shows formation of a quiescent, projected circle, and one optical system in which a circular prism forms a sharply focused, uniform circle of light. Here the collimated incident beam 11 is deviated through a constant polar angle by the prism effect. The light is distributed uniformly over the azimuthal angle φ if the circular prism 10 is centered on a normally incident beam which has cylindrically symmetric intensity distribution. For example, a concave diverging lens and a collimating lens (such as is shown in FIG. 5) form an expanded beam of this type from a "O-O mode" laser source. A spherical lens 12 focuses the deviated beam into a circle 13 on the target surface 14, the radius of this sharp circle being:

$$r = F \tan\delta \quad (2)$$

where F is the focal length of the spherical lens 12. Thus, the circle radius can be adjusted by changing F. This optical configuration produces a single circle. Given a particular circular prism, the radius of the circle of light 13 depends on the focal length of the spherical lens 12. Changing the circle radius can be accomplished by substituting another spherical lens with a different focal length.

Figure 2B:
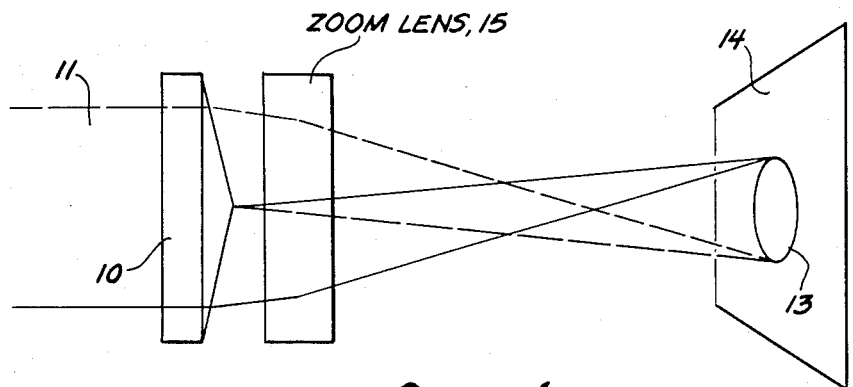

The optical system in FIG. 2b is a modification of the foregoing and generates a single, focused, uniformly illuminated circle whose radius is continuously adjustable. A zoom lens 15 is employed as the focusing lens system in place of the spherical lens. By definition a zoom lens is made with some elements movable so that the focal length can be adjusted continuously without moving the focal plane.

However, for the purpose of guiding a welding torch along a groove, seam or joint with sharply curving segments, it is desirable sometimes to concentrate the light into two or more circles, semicircles or circular arcs with slightly different radii. For example, radii of ¼ and 5/16 inch on the weld surface could be chosen, such that an optical pattern is produced as illustrated in FIG. 4. Further, for practical applications, efficient, nearly uniform illumination over the pattern is desirable. Several optical systems, all utilizing a circular prism and focusing lens, for generating these patterns are described.

Figure 3A:
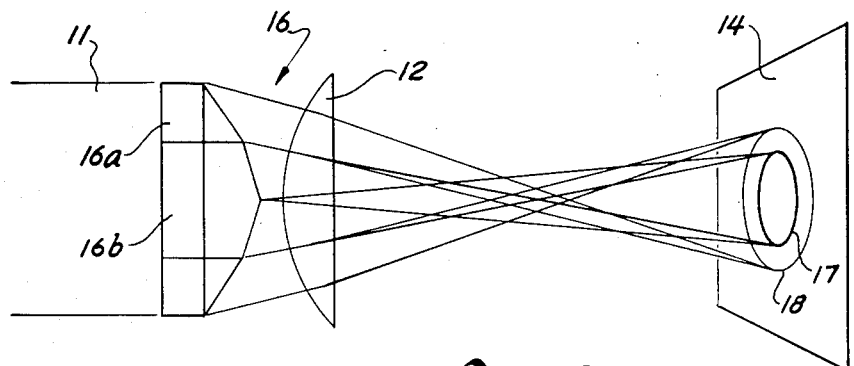
FIG. 3a shows an optical system using concentric circular prism segments for generating two focused circles.

Two or more circles can be generated by using a compound circular prism having concentric circular prism segments with slightly different wedge angles α in the position of the single circular prism shown in FIGS. 2a and 2b. A pattern of two concentric circles is produced by using the compound circular prism 16 in FIGS. 3a and 3b having two concentric circular prism segments 16a and 16b which have different wedge angles to bend the incident beam through respective polar angles by the prism effect and produce two deviated beams. The spherical lens 12 focuses these deviated beams to form the quiescent concentric light circles 17 and 18. Their radii depends on the prism segment wedge angles α and focal length F of the spherical lens.

Figure 3B:
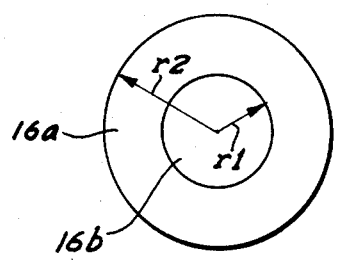
FIG. 3b is a front view of the compound circular prism.

Efficient, uniform illumination is obtained by shaping and locating the segments so that one forms a circular annulus with outer radius r2 and inner radius r1, FIG. 3b, surrounding the second segment, which is circular. The radii r1 and r2 can be calculated using knowledge of the incident beam radial intensity distribution to insure that each circle has the same brightness, and to insure that effectively all of the incident light is directed into the two circles. For example, if the beam radial illumination distribution is I(r), such that its total power P is given by $$P = 2\pi \int_0^\infty I(r) r \, dr \quad (3)$$

then r1 can be chosen to satisfy the equation $$P/2 = 2\pi \int_0^{r1} I(r) r \, dr \quad (4)$$

which places half the beam power in one circle. Then r2 is simply made large enough to intercept the rest of the beam. If the circle radii are substantially different, a better choice is obtained by adjusting the inner circular prism segment radius (r1) so that less light is provided to the smaller circle in proportion to its circumference relative to that of the larger circle. This adjustment can be accomplished by changing P/2 in the equation above to PR1/(R1+R2), where R1 and R2 are the radii of the two generated circles. This choice gives each segment of each circle the same brightness. Summarizing, properly choosing the outer radii of the two concentric circular prism segments assures that the two generated light circles have approximately the same brightness.

The structured light pattern is conveniently transferred to a robotic, vision-guided welding torch by a flexible coherent fiber optic bundle which has ends of the individual fibers arranged in identical matrices at each bundle end, reproducing a two-dimensional image. The concentric light circles are focused on the entrance of the coherent bundle and reimaged on the workpiece surface by an exit optical assembly built into the torch. Such an arc welding torch with integrated optics to view the weld puddle is described in U.S. Pat. No. 4,491,719, the disclosure of which is incorporated herein by reference, and in copending application Ser. No. Pat. No. 554,512, filed Nov. 23, 1983, now U.S. Pat. No. 4,532,405 N. R. Corby, R. M. Lund and D. C. Peroutky, "Arc Welding Torch With Two Integral Optical Systems". The illustrated components of TIG (tungsten inert gas) torch 19 are the electrical power, cover gas and coolant supply lines 20–22, coherent fiber optic bundles 23 and 24 to transmit the light pattern to the torch and transfer the weld region image to a solid state video camera and hence to the weld controller, an insulating jacket 25, the gas cup 26, and nonconsumable electrode 27. Light circles 28 and 29 are reimaged on the surface of workpieces 30 and 31 concentric with the torch electrode. The laser stripes cross the joint 32 just ahead of the weld puddle 33, within the field of view of the viewing optics, and through variations in the properties of reflected light at the joint, yield information on location of the joint edges to navigate the torch and follow the joint. At the rear, the laser stripes cross the remelt zone 34 and provide an image for postweld quality analysis.

FIG. 5 depicts an optical system which utilizes circular prisms and focusing lenses to generate two circles from two laser sources, such that the circles can be concentric with a preselected diameter ratio. Alternatively, two beams may be derived from a single laser. Stationary optical systems are provided to separately generate quiescent light circles of different radii, which are combined and projected onto a target surface such as the face of a coherent fiber optic bundle. The narrow beams generated by polarized laser sources 35 and 36 are respectively polarized perpendicular and parallel to the diagram plane. The first of these, expanded and collimated by lenses 37 and 38, is incident on the circular prism 39. The deviated beams are focused to a sharp circle by spherical lens 40 and reflected by mirror 41 onto a polarizing beam splitter 42. The common beam splitter such as a half-silvered mirror transmits part of the incident light and reflects the other part, but the polarizing beam splitter has the property that all of the incident light is reflected. The orthogonally linearly polarized narrow laser beam is expanded and collimated by lenses 43 and 44, and the slightly smaller circle generated by circular prism 45 and spherical lens 46 is completely transmitted by polarizing beam splitter 42.

Polarizing beam splitter 42 in this case functions as a combiner. The two concentric laser circles are focused and projected onto the entrance of coherent fiber optic bundle 47 and, in the torch assembly, the emerging beam is reimaged by lens 48 and projected onto the groove, seam or joint in workpiece 49. The two laser circles 50 and 51 have any desired diameter ratio. For a 5:4 ratio, lenses 38, 40, 44 and 46 can have a 25 mm diameter, the first and second can have a 125 mm focal length, the third a 125 mm focal length, and the fourth a 100 mm focal length. Expander lenses 37 and 43 can have an 8 mm diameter and a 12 mm focal length. In principle three or more concentric laser circles may be generated by separate optical systems and combined, using multiple lasers or a single laser, if desired, by splitting a single laser output beam.

Figure 6:
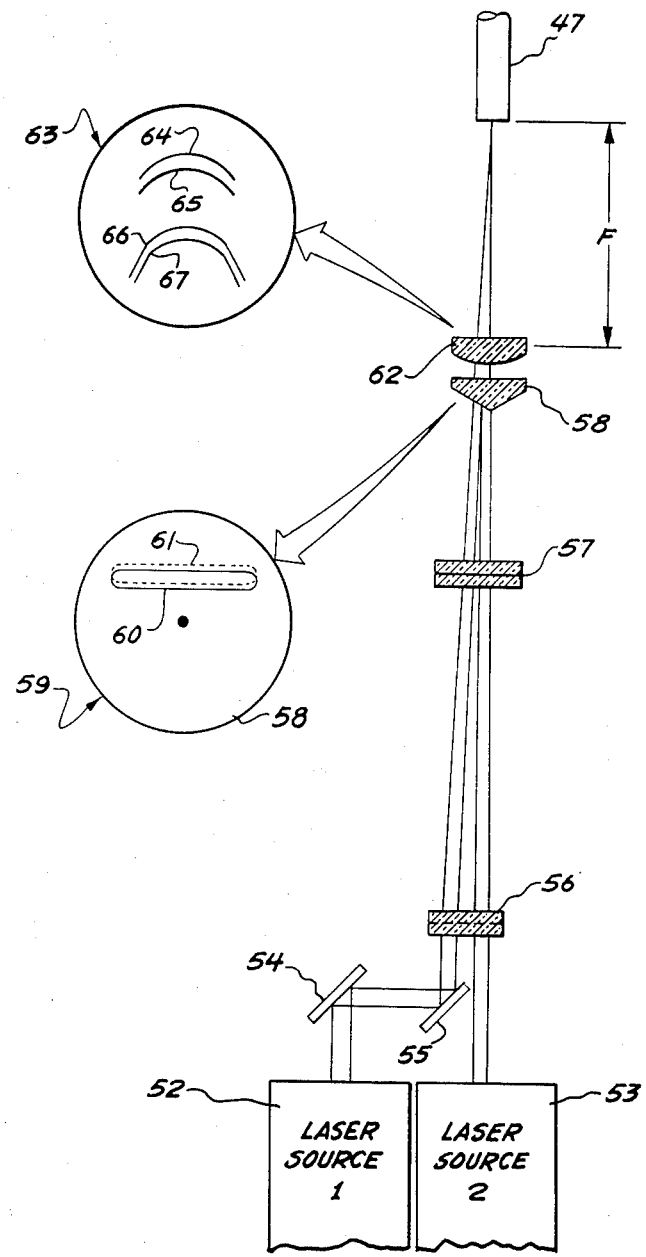
FIG. 6 is a system to generate two circular or quasi-parabolic arcs from two laser sources; the patterns of the expanded laser beams on the circular prism and the alternative arc patterns on the fiber optic bundle entrance are drawn to an enlarged scale.

FIG. 6 shows a stationary optical system to generate two circular arcs, and approximately circular or quasi-parabolic arcs, using a single circular prism. Narrow laser beams from sources 52 and 53, the first reflected by mirrors 54 and 55, are passed through a cylindrical beam expander, comprised of cylindrical lenses 56 and 57, to expand the beams in a direction perpendicular to the diagram. The pattern of the expanded beams incident on one half or segment of circular prism 58 is illustrated at 59. The elongated rectangular, expanded beams 60 and 61 may overlap or be displaced slightly. The beams deviated by the prism effect are focused by a spherical lens 62 which has a focal length F. Typical arc patterns from this optical configuration, at the plane of focus on the face of coherent fiber optic bundle 47, are drawn enlarged at 63. The top pattern is two offset circular arcs 64 and 65, typically having a 90°–120° angular extent, obtained with the cylindrical beam expanders 56, 57 focused for collimation. The lower pattern of offset approximately circular or quasi-parabolic arcs 66 and 67, is obtained with the expander focused for slight divergence. Three or more such arcs or a single arc can be generated with this optical system, when properly modified.

While not limited thereto, the quiescent circle and arc generating optical systems have utility in automation and robotic tracking and edge following applications, such as TIG and MIG welding systems. Another application is an adhesive applying gun where a single edge is followed. Still another is automated grinding and deburring. The structured light patterns can be directly focused onto the workpiece surface; the use of a fiber optic cable, a flexible relay device, is not essential.

While the invention has been particularly shown and described with reference to several preferred embodiments thereof, it will be understood by those skilled in the art that the foregoing and other changes in form and details may be made without departing from the spirit and scope of the invention.

What is claimed is:

1. A quiescent circular light pattern generator comprising:
   sources of collimated incident light beams;
   stationary optical systems to separately generate quiescent, uniformly illuminated light circles of different radii, each system comprised of a circular prism to deviate the repsective incident beam by the prism effect and a focusing lens; and
   means to combine said light circles and project a concentric circle pattern onto a target surface;
   wherein said sources comprise lasers and said target surface is the entrance of a coherent fiber optic bundle by which said concentric circle pattern is transferred to a vision-guided arc welding torch for use in tracking a joint in a workpiece.

2. The light pattern generator of claim 1 wherein said focusing lens is a spherical lens or variable focal length zoom lens.

3. A quiescent arc-shaped light pattern generator comprising:
   a source of plural laser beams;
   a cylindrical beam expander to expand said beams to elongated rectangles of light;
   a stationary optical system comprised of a circular prism and a spherical lens to generte focused, quiescent, spatially displaced circular or approximately circular arcs;
   said elongated rectangles of light being incident on a segment of said circular prism and said spherical lens focusing beams deviated by the prism effect onto the entrance of a coherent fiber optic bundle by which said arcs are transferred to a vision-guide welding torch for use in tracking a joint in a workpiece.

* * * * *